United States Patent Office 3,499,744
Patented Mar. 10, 1970

3,499,744
SECURING METAL BRACKETS TO GLASS
Richard J. Tolliver, Greensburg, Pa., assignor to PPG Industries, Inc., Pittsburgh, Pa., a corporation of Pennsylvania
No Drawing. Filed Nov. 2, 1966, Ser. No. 591,440
Int. Cl. C03c 27/00
U.S. Cl. 65—43
4 Claims

ABSTRACT OF THE DISCLOSURE

Adhering a metal bracket suitable for supporting a rear view mirror to a surface of a curved glass sheet by using the residual heat of bending to help adhere an adhesive coated surface of the metal bracket to said sheet.

This invention relates to a method of securing a metal bracket to a surface of a bent glass sheet using a portion of the heat stored in a glass sheet when it is heated for bending to help soften an adhesive coating on the bracket so that a brief application of a bonding force while engaging the bracket with its coating in contact with the heated glass secures the bracket to the glass at least until the assembly is permanently laminated in a high-temperature high pressure autoclave.

In U.S. Patent No. 3,242,026 to John B. Saxton and William G. Sharp, a metallic bracket for supporting a rear view mirror is attached directly to the surface of a windshield by assembling a heated bracket with the thermoplastic material adhered to its surface to a glass plate and applying a bonding load and high frequency heating to the assembly. After applying high frequency heating and pressure for a brief period of time, the application of heat is discontinued while the bonding load is maintained for an additional period of time.

The present invention makes it unnecessary to preheat the metallic bracket or to apply high frequency induction heating during the application of the bracket to the bent windshield. The present invention provides more efficient operation than the prior art by virtue of the fact that it utilizes the heat stored in the glass which has been heated incidental to its bending operation before the bent glass cools to below a temperature range of 250 to 300 degrees Fahrenheit.

The residual heat in the bent glass is sufficient to at least temporarily adhere the metal bracket to the glass in the desired location. At this temperature, the thermoplastic sheet material, such as an adhesive composed of polyvinyl butyral containing 7 parts of triethylene glycol dihexoate plasticizer having a thickness of approximately .02 inch, which forms a bonding surface for the metal bracket, becomes tacky and is capable of forming a good temporary bond if an operator applies a bonding force of between 15 and 25 pounds between the bracket and the glass over an area of the bracket of approximately 1 square inch for a period of 7 to 12 seconds, preferably about 10 seconds. The adhesive hardens when the glass cools, thus producing an adhesive bond between the bracket and the glass sheet.

Since windshields are required to be laminated such an adhesive on the bonding surface of the metal bracket can be adhered more securely to the windshield when the bent glass sheets forming the ultimate laminated windshield are laminated in an autoclave. Two glass sheets that have been bent simultaneously are separated and reassembled with an interlayer of plasticized polyvinyl butyral for lamination in an autoclave under elevated temperature and pressure conditions for sufficient time to produce a transparent laminate, for example 30 minutes at about 200 pounds per square inch and 275 degrees Fahrenheit.

Under such laminating conditions, mirror brackets that were secured to the glass sheets while still hot from bending became more securely bonded to the windshield while the assembled windshield components become a transparent composite assembly in the autoclave.

In a typical bending operation such as depicted to U.S. Patent No. 2,876,595 to James S. Golightly, assigned to PPG Industries, Inc., a pair of glass sheets are mounted in bending relation to a bending mold of outline configuration. The sheets are superimposed in stacked relation with their edges substantially in alignment in such a manner that the bent air becomes aligned around its marginal edge after bending. The glass is mounted on a heated mold and conveyed through a tunnel-like lehr, such as the lehr of U.S. Patent No. 2,794,300 of James S. Golightly, assigned to PPG Industries, Inc., where the glass is heated to a temperature at which it is subject to deformation. For example, the deformation temperature for a pair of glass sheets having a total nominal thickness of approximately ¼ inch is slightly under approximately 1150 degrees Fahrenheit. At this temperature, the glass sags relatively rapidly so that its marginal edge portion slightly interior of its peripheral edge engages the upward facing surface of the outline mold.

It is frequently necessary to sectionalize the mold into relatively pivoted sections. As the glass conforms to the shaping surface, it is passed through an annealing lehr which comprises a succession of closely controlled regions, each region having a temperature lower than that of the preceding region. The glass is cooled to below the strain point and removed from the lehr.

Prior to the present invention, at this point in the fabrication cycle, the glass was cooled to room temperature, and then the sheets were separated from one another and reassembled with a sheet of plasticized thermoplastic material such as polyvinyl butyral plasticized with 41 parts by weight of triethylene glycol hexoate plasticizer per 100 parts by weight of polyvinyl butyral. The assembly was then prepressed by evacuation of the marginal portion through a peripheral channel member surrounding the glass and the plastic while heated for a time and at a temperature sufficient to adhere the glass and plastic at least along its marginal portions, thereby rendering the assembly impervious to penetration of oil in an oil autoclave.

The windshield assemblies with their marginal portions adhering were then subject to the conventional autoclave cycle of 30 minutes at 275 degrees Fahrenheit and 200 pounds per square inch pressure. The resultant windshields were washed to remove the oil from the autoclave, and inspected for optical defects and for conformity to the shapes desired.

According to the prior art as exemplified in U.S. Patent No. 3,131,351 to Joseph D. Ryan and the aforementioned U.S. Patent No. 3,242,026 to J. B. Saxton et al., a glass bracket was attached to the windshield simultaneously with the formation of the windshield as in Ryan or a glass or metal bracket, respectively, was attached subsequent to the formation of the windshield as in either Ryan or Saxton et al. The term formation of the windshield refers to the lamination of the two glass sheets to the plastic interlayer.

When a metal bracket is adhered to an already laminated windshield as suggested in the prior art, the heat applied to the vicinity of the bond is applied locally to the windshield interlayer only in the region where the bracket is to be adhered to the windshield. This localized heating of the windshield interlayer may extend beyond the region hidden by the bracket and may cause the interlayer to bubble and/or become discolored in the region surrounding the area where the bracket hides any defects of this nature.

The brackets on which the rear view mirrors are mounted are provided with thin thermoplastic discs of plasticized polyvinyl butyral containing 7 percent by weight of plasticizer. The thermoplastic discs are cut to the size of the bonding surface of the bracket or slightly smaller. Each thermoplastic disc is aligned with the bonding surface of a bracket and the bracket is heated to approximately 140 degrees Fahrenheit until the thermoplastic disc adheres to the bonding surface of the bracket. The bracket is then stored with other like brackets until it is ready to be attached to a bent glass sheet as taught by the present invention.

According to the present invention, the bent glass sheets are normally removed from the bending and annealing lehr at a temperature of about 300 degrees Fahrenheit or more. When the glass is at a temperature of about 250 to 300 degrees Fahrenheit, it has been determined that the thermoplastic coated bracket may be applied to the still warm glass sheet with the bonding surface engaging the upwardly facing surface of the bent glass sheet at a pressure which is capable of being applied by an operator, namely, about 15 to 25 pounds per square inch. This pressure is applied for approximately 10 seconds. This manner of adhering the metal bracket to the glass surface using the heat stored in the recently bent glass is sufficient to adhere the metal bracket to the glass for a time sufficient to maintain the bond while the bent glass sheets are separated, and a sheet of polyvinyl butyral plastic inserted intermediate the two bent sheets to form an assembly to be subjected to the prepressing and laminating operations described hereinabove.

The present invention needs no expensive high frequency induction heating equipment as required by Saxton et al. Instead, the heat required to bend the glass is also employed in the lamination of the metal bracket for the rear view mirror to the glass surface that becomes the interior windshield surface.

In most countries of the world, tempered windshields of monolithic glass are employed instead of the safety laminated windshields of the United States and Canada. The present invention also makes it possible to employ the present invention for adhering the metal bracket of a rear view mirror to a surface of a tempered windshield. According to the present invention, the polyvinyl butyral plastic having a relatively low plasticizer content (about 7 percent by weight) is adhered to the bonding surface of the bracket as in the laminated windshield operation described hereinabove. However, in heating glass to be tempered, it is necessary to raise its temperature to a much higher temperature than is required merely for bending and annealing. The glass attains a temperature of about 1225 degrees Fahrenheit or thereabouts during the heating operation incidental to bending and tempering.

As the glass conforms to the shaping surface, it is immediately quenched by applying cooling fluid against opposite surfaces of the glass at a rapid rate to quickly quench the glass and reduce its surface temperature to below the strain point very promptly. Cooling is continued until the entire glass sheet is below the strain point. However, the glass surface temperature is still considerably above room temperature when the glass becomes tempered. Thus, when the tempered glass reaches a temperature in the range of 250 to 300 degrees Fahrenheit, the bonding surface of the bracket containing the sealable plastic disc is applied with a suitable load against the desired portion of the tempered windshield.

Since no subsequent autoclave operation is present in the production of tempered windshields, it may be necessary to spray a small amount of plasticizer onto the glass contacting surface of the thin sheet of polyvinyl butyral that is on the bonding surface of the rear view mirror bracket immediately before applying the bonding surface to the heated, tempered windshield. Such application of plasticizer to the surface provides a relatively rapid rate of bonding the surface to the heated windshield, if done immediately after spraying the plasticizer. As the bonded surface becomes hot on contact with the hot glass, the additional applied plasticizer is dispersed throughout the thickness of the polyvinyl butyral to help produce a rapid adhesion between the bracket and the tempered windshield. Such additional step is not necessary in the laminated windshield operation.

The form of the invention shown and described in this disclosure represents an illustrative embodiment and a certain modification thereof. It is understood that various changes may be made without departing from the spirit of the invention as defined in the claimed subject matter which follows:

What is claimed is:

1. A method for bonding a metal bracket having a bonding surface consisting essentially of a thermoplastic adhesive coating to a surface of a bent glass sheet comprising supporting said glass sheet in bending relation to a shaping mold, heating said glass sheet to a deformation temperature to shape said glass sheet into conformity with said shaping mold, cooling said bent glass to below the strain point of the glass and before the glass temperature cools below a temperature range of 250 to 300 degrees Fahrenheit, applying said bonding surface to said heated glass to heat said bonding surface solely from residual glass heat imparted during said heating for shaping, applying sufficient bonding force for a brief period sufficient to adhere said bracket to said bent glass sheet and permitting said bracket, bonding surface and bent glass sheet to cool to harden said bonding surface and produce an adhesive bond between said metal bracket and said glass sheet.

2. A method as in claim 1, wherein said shaping mold is disposed horizontally and said bracket is applied with said bonding surface engaging the upward facing surface of the bent glass sheet.

3. The method according to claim 2, wherein a pair of glass sheets are bent simultaneously, said bracket is applied with said bonding surface engaging the surface of the sheet of said pair of bent sheets that ultimately becomes the interior windshield surface, and then the pair of bent glass sheets are separated, a sheet of thermoplastic interlayer material inserted therebetween and reassembled to form a sandwich, and the sandwich is laminated under sufficient pressure and temperature to produce a transparent laminated bent windshield having said mirror bracket bonded thereto.

4. The method according to claim 1, wherein said bent sheet is chilled rapidly to below its strain point to impart a temper thereto and said bonding surface is applied to said tempered glass sheet before said tempered glass sheet cools below said temperature range of 250 to 300 degrees Fahrenheit and without reheating said sheet.

References Cited

UNITED STATES PATENTS

| | | | |
|---|---|---|---|
| 2,159,993 | 5/1939 | Krueger | 156—321 |
| 2,435,267 | 2/1948 | Cahn | 156—321 |
| 2,512,929 | 6/1950 | Galbraith et al. | 156—89 |
| 3,131,251 | 4/1964 | Ryan | 248—467 |
| 3,242,026 | 3/1966 | Saxton et al. | 156—272 |

REUBEN EPSTEIN, Primary Examiner

U.S. Cl. X.R.

156—321; 65—54, 59